(12) United States Patent
Nanami

(10) Patent No.: US 8,305,254 B2
(45) Date of Patent: Nov. 6, 2012

(54) OBJECT DETECTING APPARATUS

(75) Inventor: Takeshi Nanami, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/003,965

(22) PCT Filed: Sep. 28, 2009

(86) PCT No.: PCT/JP2009/066793
§ 371 (c)(1),
(2), (4) Date: Jan. 13, 2011

(87) PCT Pub. No.: WO2011/036803
PCT Pub. Date: Mar. 31, 2011

(65) Prior Publication Data
US 2012/0176267 A1 Jul. 12, 2012

(51) Int. Cl.
*G01S 13/00* (2006.01)
*G06F 17/00* (2006.01)
*G06G 7/78* (2006.01)
*G08G 1/16* (2006.01)

(52) U.S. Cl. ............... 342/70; 701/1; 701/300; 701/301

(58) Field of Classification Search .............. 342/70–72; 701/1, 300, 301
See application file for complete search history.

(56) References Cited

U.S. PATENT DOCUMENTS

| | | | |
|---|---|---|---|
| 6,999,896 B2 * | 2/2006 | Takahashi | 702/181 |
| 7,667,636 B2 * | 2/2010 | Kikuchi | 342/70 |
| 7,733,266 B2 * | 6/2010 | Kikuchi | 342/70 |
| 2006/0190175 A1 * | 8/2006 | Moriizumi et al. | 701/301 |
| 2008/0042894 A1 * | 2/2008 | Kikuchi | 342/71 |
| 2008/0215231 A1 * | 9/2008 | Breed | 701/117 |
| 2009/0069952 A1 * | 3/2009 | Kikuchi | 701/1 |

(Continued)

FOREIGN PATENT DOCUMENTS

JP A-2004-17763 1/2004

(Continued)

OTHER PUBLICATIONS

International Search Report issued in International Application No. PCT/JP2009/066793 on Oct. 20, 2009 (with translation).

*Primary Examiner* — Jack W Keith
*Assistant Examiner* — Peter Bythrow
(74) *Attorney, Agent, or Firm* — Oliff & Berridge, PLC

(57) ABSTRACT

The judgment accuracy is enhanced to judge whether or not an object is actually exists. An object detecting apparatus includes an acquiring unit which acquires information of the object by means of a radar, an angle detecting unit which detects an angle of the object with respect to a subject vehicle, an extrapolating unit which extrapolates the information of the object, and a judging unit which judges whether or not the object actually exists on the basis of the information of the object acquired by the acquiring unit and the information of the object extrapolated by the extrapolating unit, wherein the judging unit relaxes a condition to judge that the object actually exists when the information, which is extrapolated if an amount of change of the angle is not less than a predetermined amount, is included in the information of the object to be used to judge whether or not the object actually exists, as compared with when the information, which is extrapolated by the extrapolating unit is not included.

3 Claims, 4 Drawing Sheets

U.S. PATENT DOCUMENTS

| | | | |
|---|---|---|---|
| 2009/0076702 A1* | 3/2009 | Arbitmann et al. | 701/96 |
| 2009/0187290 A1* | 7/2009 | Moriizumi et al. | 701/1 |
| 2010/0109937 A1* | 5/2010 | Koike | 342/70 |

FOREIGN PATENT DOCUMENTS

| | | |
|---|---|---|
| JP | A-2004-230947 | 8/2004 |
| JP | A-2007-232409 | 9/2007 |
| JP | A-2008-51614 | 3/2008 |
| JP | A-2008-216213 | 9/2008 |
| JP | A-2008-298543 | 12/2008 |
| JP | A-2009-63439 | 3/2009 |

* cited by examiner

OBJECT DETECTING APPARATUS

TECHNICAL FIELD

The present invention relates to an object detecting apparatus.

BACKGROUND ART

A technique is known, wherein provisional collision positions are predicted on the basis of an orbit of a subject vehicle and an orbit of a moving object to count a number of times of determination of the provisional collision position for each of the provisional collision positions, and the position, which has the largest number of times of determination of the provisional collision position, is predicted as the collision position of the moving object in relation to the subject vehicle (see, for example, Patent Document 1).

In the case of this technique, it is possible to predict the collision position. However, it is impossible to enhance the judgment accuracy for whether or not the subject vehicle and the moving object collide with each other and the judgment accuracy for whether or not the moving object exists. That is, the radius of curvature of the subject vehicle is estimated on the basis of a detected steering angle, while the detection accuracy of a radar is not enhanced. Therefore, it is impossible to enhance the detection accuracies as described above.

PRECEDING TECHNICAL DOCUMENTS

Patent Documents

Patent Document 1: JP2008-216213A;
Patent Document 2: JP2004-230947A.

SUMMARY OF THE INVENTION

Task to be Solved by the Invention

The present invention has been made taking the foregoing problem into consideration, an object of which is to provide a technique for enhancing the judgment accuracy for whether or not an object actually exists.

Solution for the Task

In order to achieve the object as described above, an object detecting apparatus (object detector) according to the present invention adopts the following means. That is, the object detecting apparatus according to the present invention comprises:

an acquiring unit which acquires information of an object existing around a subject vehicle by unit of a radar;

an angle detecting unit which detects an angle of the object with respect to the subject vehicle;

an extrapolating unit which extrapolates the information of the object when any information of the object is not acquired after acquiring the information of the object by the acquiring unit; and a judging unit which judges whether or not the object actually exists on the basis of the information of the object acquired by the acquiring unit and the information of the object extrapolated by the extrapolating unit, wherein:

the judging unit relaxes a condition to judge that the object actually exists when the information, which is extrapolated by the extrapolating unit if an amount of change of the angle detected by the angle detecting unit is not less than a predetermined amount, is included in the information of the object to be used to judge whether or not the object actually exists, as compared with when the information, which is extrapolated by the extrapolating unit, is not included.

The information of the object, which is acquired or obtained by the acquiring unit, may include, for example, the distance, the relative velocity, and the lateral position of the object. The angle detecting unit detects the angle of the object with respect to a specified direction of the subject vehicle. For example, it is assumed that the position of installation of the radar is the center, and the traveling direction of the subject vehicle is at zero degree. On this assumption, the angle, which ranges therefrom to the point of reflection of the radar wave on the object, is detected.

In this context, if the angle of the object with respect to the subject vehicle is changed, the intensity of the reflected wave is changed. Further, if any reflected wave, which has a prescribed intensity, is not obtained due to the decrease in the intensity of the reflected wave, the reliability of the information of the object is lowered. In such a situation, the information of the object is extrapolated without using the information of the object acquired by the acquiring unit. That is, the phrase "when any information of the object is not acquired" may reside in at least one of a timing at which the reflected wave cannot be received and a timing at which the reflected wave having the prescribed intensity cannot be received.

In this context, if the number of times of acquisition of the information of the object acquired by the acquiring unit is large, it is affirmed that the probability of actual existence of the object is high. On the contrary, if the number of times of extrapolation of the information of the object extrapolated by the extrapolating unit is large, it is affirmed that the probability of actual existence of the object is low. According to the relationship as described above, it is possible to judge whether or not the object actually exists on the basis of the information of the object acquired by the acquiring unit and the information of the object extrapolated by the extrapolating unit.

However, if the information of the object is extrapolated in many cases due to the decrease in the intensity of the reflected wave, it is feared that the judgment may be made such that the object does not actually exist, although the object actually exists. As described above, if the amount of change of the angle of the object with respect to the subject vehicle is large, the information of the object is extrapolated in some cases even when the object actually exists. Therefore, it is feared that the judgment may be made such that the object does not actually exist.

In view of the above, the condition, under which it is judged that the object actually exists, is relaxed in the state as described above. That is, the condition to judge that the object actually exists is relaxed, because the information of the object is extrapolated in many cases even if the object actually exists, when the amount of change of the angle detected by the angle detecting unit is not less than the predetermined amount. It is noted that the predetermined amount is the amount of change of the angle at which the information of the object is extrapolated even when the object actually exists. The predetermined amount may be, for example, an amount of change of the angle at which the intensity of the reflected wave may be changed to be not more than a threshold value. When the condition, under which it is judged that the object actually exists, is relaxed, the judgment tends to be made such that the object actually exists, even when the extrapolation is performed in many cases. When the condition to judge that the object actually exists is relaxed only when the state as described above is provided, then it is possible to improve the judgment accuracy for whether or not the object actually exists. The condition to judge that the object actually exists is not relaxed when the information, which is extrapolated by the extrapolating unit, is not included and when only the information, which is extrapolated if the amount of change of the angle detected by the angle detecting unit is less than the predetermined amount, is included even when the information extrapolated by the extrapolating unit is included.

In the present invention, the judging unit may calculate a probability of existence of the object on the basis of a number of times of acquisition of the information of the object by the acquiring unit and a number of times of extrapolation of the information of the object by the extrapolating unit in a predetermined period of time to judge that the object actually exists if the probability is not less than a threshold value; and the condition to judge that the object actually exists may be relaxed by decreasing the threshold value.

In this context, the larger the number of times of successful acquisition of the information of the object by the acquiring unit is, the higher the probability of actual existence of the object (hereinafter referred to as "existence probability") is. On the other hand, the larger the number of times of extrapolation of the information of the object by the extrapolating unit is, the lower the existence probability is. The existence probability can be obtained by counting the numbers of times in the predetermined period of time. The predetermined period of time is set or established as the period of time required to determine the existence probability. In the present invention, it is judged that the object actually exists if the existence probability is not less than a threshold value. When the threshold value is decreased, even if the number of times of successful acquisition of the information of the object by the acquiring unit is smaller, then it is judged that the object actually exists. That is, even when the intensity of the reflected wave is lowered, the judgment tends to be made such that the object actually exists, by decreasing the threshold value of the existence probability. The threshold value is the lower limit value of the existence probability at which it is possible to judge that the object actually exists.

In the present invention, the threshold value may be decreased when the object is a moving object as compared with when the object is a stationary object.

In this context, when the object is the moving object, it is possible to improve the judgment accuracy for whether or not the object actually exists, by lowering the threshold value as described above. However, even when the object actually exists, the object also includes those which are unnecessary to be regarded as the objective as exemplified, for example, by a guard rail. In this way, when the object is the stationary object, it is unnecessary to include some objects as the objective in some cases.

In view of the above, when the object is the stationary object, the degree of decrease in the threshold value is decreased, even when the threshold value is decreased. Accordingly, it is possible to suppress the execution of any unnecessary action (for example, any warning for a driver or any action to avoid the collision). In this way, when the object is the moving object, the judgment tends to be made such that the object actually exists. On the other hand, when the object is the stationary object, the judgment that the object actually exists is hardly made, as compared with the case in which the object is the moving object. That is, even when the stationary object, which is unnecessary to be detected, is present, it is possible to suppress the execution of any unnecessary action by making the judgment that the object does not actually exist. When the object is the moving object, the threshold value is decreased. Therefore, it is possible to more accurately judge whether or not the object actually exists.

Effect of the Invention

According to the present invention, it is possible to enhance the judgment accuracy for whether or not the object actually exists.

BRIEF DESCRIPTION OF THE DRAWINGS

FIG. 2 shows the change of the relative angle between a subject vehicle and another vehicle or object vehicle (object).

MODE FOR CARRYING OUT THE INVENTION

Specified embodiments of the object detecting apparatus according to the present invention will be explained below on the basis of the drawings.

First Embodiment

Figure 1:
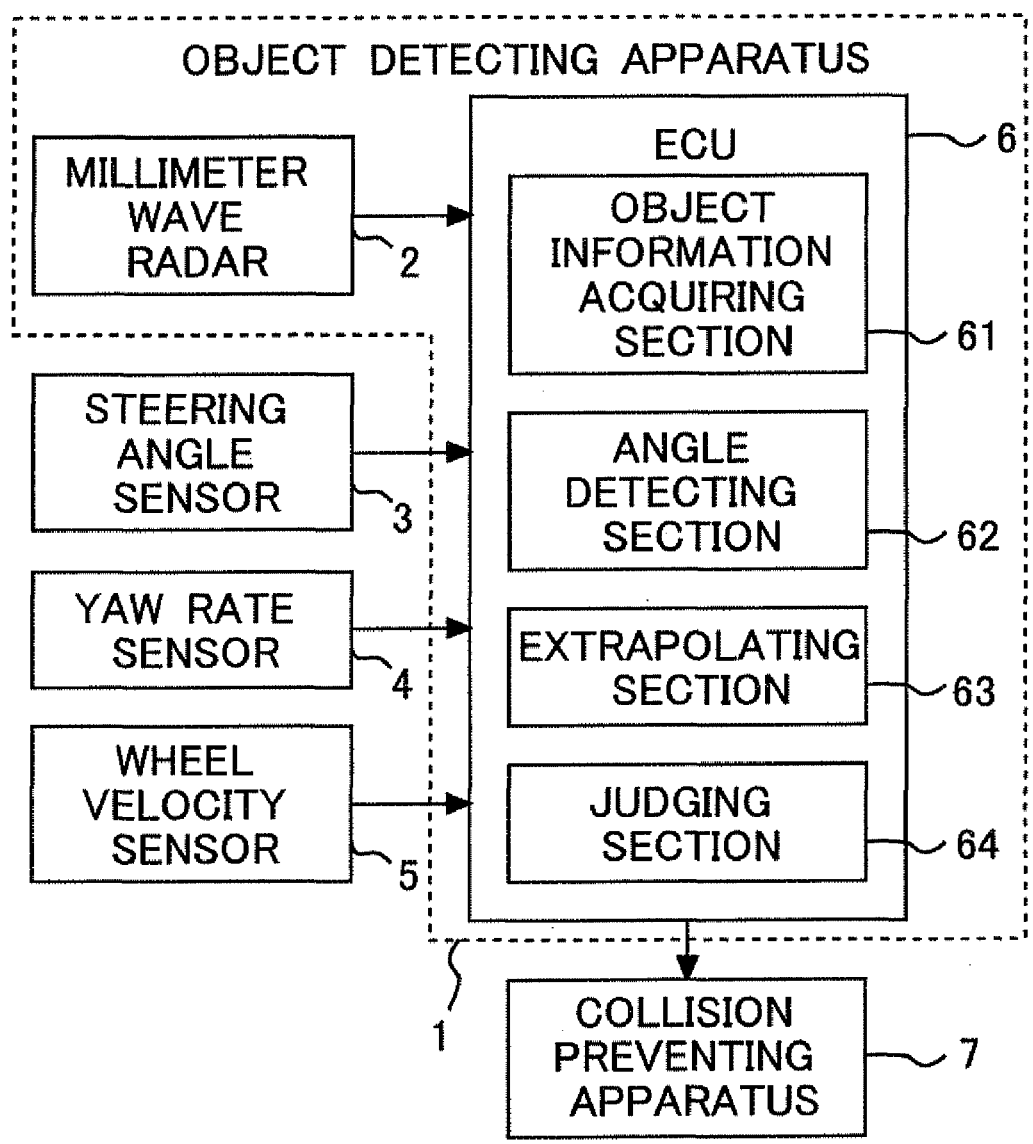
FIG. 1 shows a block diagram illustrating an object detecting apparatus according to an embodiment.

FIG. 1 shows a block diagram illustrating an object detecting apparatus according to an embodiment of the present invention. The object detecting apparatus 1 according to this embodiment is an apparatus which is carried on a subject vehicle to travel on a road and which judges whether or not any object such as another vehicle (object vehicle) or the like exists around the subject vehicle. An alarm is given to a driver when the object such as the object vehicle or the like exists and a pressure state is given.

The object detecting apparatus 1 is constructed to include a millimeter wave radar 2 and ECU 6. A steering angle sensor 3, a yaw rate sensor 4, and a wheel velocity sensor 5 are connected to ECU 6.

The millimeter wave radar 2 is provided at a front portion of the subject vehicle to detect the distance and the direction from the subject vehicle in relation to the object existing in the frontward direction or the side direction of the subject vehicle. The millimeter wave radar 2 performs the scanning with the millimeter wave in a predetermined range in the frontward direction and the side direction of the subject vehicle to receive the reflected wave thereof. Accordingly, the millimeter wave radar 2 detects the distance to the object in relation to the respective directions in which the reflected wave is detected. The detection by the millimeter wave radar 2 is performed every time when a predetermined period of time elapses. The millimeter wave radar 2 successively outputs, to ECU 6, a signal corresponding to the detected direction and the distance.

The steering angle sensor 3 is a sensor which is provided for a steering shaft of the subject vehicle to detect the steering angle of the steering of the subject vehicle. The steering angle sensor 3 is provided with, for example, a rotary encoder to detect the direction and the magnitude or size of the steering angle inputted by the driver of the subject vehicle. The steering angle sensor 3 outputs, to ECU 6, a steering angle signal corresponding to the direction and the magnitude of the detected steering angle.

The yaw rate sensor 4 is a sensor which is provided at a portion of the subject vehicle to detect the yaw rate of the subject vehicle. The yaw rate sensor 4 detects the yaw rate of the subject vehicle, and the yaw rate sensor 4 outputs, to ECU 6, a signal corresponding to the detected yaw rate.

The wheel velocity sensor 5 is a sensor which is provided for each of wheels to detect the wheel velocity pulse. The wheel velocity sensor 5 detects each of the wheel velocity pulses for each of the wheels, and the wheel velocity sensor 5 outputs, to ECU 6, a wheel velocity pulse signal corresponding to the detected wheel velocity pulse.

ECU 6 is constructed to include an object information acquiring section 61, an angle detecting section 62, an extrapolating section 63, and a judging section 64. ECU 6 principally comprises a computer including, for example, CPU, ROM, and RAM. The object information acquiring section 61 successively acquires the signal outputted from the millimeter wave radar 2 to detect the object existing in the frontward direction or the side direction of the subject vehicle on the basis of the signal and calculate the position of the object existing in the frontward direction or the side direction of the subject vehicle with respect to the subject vehicle. The angle detecting section 62 successively acquires the signal outputted from the millimeter wave radar 2 to calculate the angle of the object with respect to the traveling direction of the subject vehicle on the basis of the signal. The extrapolating section 63 extrapolates the information of the object if the intensity of the reflected wave is not more than a predetermined threshold value. The judging section 64 judges whether or not the object actually exists on the basis of the information of the detected object.

In this embodiment, the object information acquiring section 61 corresponds to the object information acquiring unit of the present invention, the angle detecting section 62 corresponds to the angle detecting unit of the present invention, the extrapolating section 63 corresponds to the extrapolating unit of the present invention, and the judging section 64 corresponds to the judging unit of the present invention.

ECU 6 acquires the signals outputted from the steering angle sensor 3, the yaw rate sensor 4, and the wheel velocity sensor 5 respectively to execute the predetermined processes on the basis of the respective acquired signals. Accordingly, it is judged whether or not the subject vehicle has a fear of collision with the object.

If it is judged in the judging section 64 that the object exists and the object has a fear of collision with the subject vehicle, then ECU 6 outputs a signal to a collision preventing apparatus 7. The collision preventing apparatus 7 performs the collision preventing action, for example, by controlling a brake and/or a handle (steering wheel). Further, a warning may be given to the driver by using, for example, the light and/or the sound.

The detection of the object by the millimeter wave radar 2 is performed at every predetermined cycle. The reflected waves, which are detected at respective cycles, are strong in some cases or weak in other cases. For example, when the angle of the object with respect to the traveling direction of the subject vehicle is changed, for example, when the subject vehicle changes the lane or when the object vehicle changes the lane, then the intensity of the reflected wave is changed, because the direction of reflection of the millimeter wave is changed.

In this context, if the received reflected wave is weak, the reliability is lowered when the object is detected. In view of the above, when the object is detected, if the intensity of the reflected wave exceeds a predetermined threshold value, then the signal, which is acquired or obtained from the reflected wave in this situation, is used as it is to obtain the information of the object. On the other hand, when the intensity of the reflected wave is not more than the predetermined threshold value, then the signal, which is obtained from the reflected wave in this situation, is not used, but the extrapolating section 63 extrapolates the information of the object. When the extrapolation is performed, the information of the object (for example, the distance, the relative velocity, and the lateral position) is speculated by utilizing the hysteresis (historical data) obtained up to that time. In this procedure, it is possible to use the well-known extrapolation method.

When the scanning is performed a plurality of times by the millimeter wave radar 2 in a predetermined period of time, if the intensity of the reflected wave exceeds the predetermined threshold value in many cases, then the probability of existence of the object is raised. On the contrary, if the intensity of the reflected wave is not more than the predetermined threshold value in many cases, the probability of existence of the object is lowered. In view of the above, it is judged whether or not the object really exists by using the probability of existence of the object (hereinafter referred to as "existence probability").

At first, for example, the existence probability, which corresponds to 10 cycles in relation to the calculation cycle, is calculated. In this procedure, the judging section 64 increases the existence probability by 20% every time when one piece of information of the object exists when the intensity of the reflected wave exceeds the predetermined threshold value. Further, the judging section 64 decreases the existence probability by 20% every time when one piece of extrapolated information of the object exists. If the existence probability corresponding to the past 10 cycles, which is calculated as described above, is, for example, not less than 80%, it is judged that the object actually exists. In other words, the threshold value, at which it is judged that the object actually exists, is 80%. In this embodiment, the 10 cycles in relation to the calculation cycle correspond to the predetermined period of time of the present invention. If the predetermined period of time is shortened, then the judgment accuracy is lowered, but the time required for the judgment is shortened. Therefore, the predetermined period of time may be determined depending on which factor has priority.

When the angle of the object with respect to the traveling direction of the subject vehicle is changed, for example, when the subject vehicle changes the lane or when the object vehicle changes the lane, then the intensity of the reflected wave is changed, because the direction of reflection of the millimeter wave is changed. In this situation, the information of the object tends to be extrapolated. However, if the information of the object is extrapolated on account of the reflected wave weakened for the reason as described above, then it is judged that the object does not actually exists in some cases although the object actually exists, or a certain period of time is required until it is judged that the object actually exists in other cases.

In view of the above, the judging section 64 lowers the threshold value at which it is judged that the object actually exists, if the angle of the object with respect to the traveling direction of the subject vehicle is changed by not less than a predetermined amount. When the threshold value of the existence probability is decreased as described above, the condition to judge that the object actually exists is relaxed. Therefore, the judgment tends to be made such that the object actually exists. In the example described above, the threshold value is 80%, and it is judged that the object exists if the existence probability is not less than 80%. On the other hand, if the information of the object, which is extrapolated when the angle of the object with respect to the traveling direction of the subject vehicle is changed by not less than the predetermined amount, is included, the threshold value is, for example, 60%. That is, if the existence probability is not less than 60%, it is judged that the object actually exists. Accordingly, even if the intensity of the reflected wave of the millimeter wave is changed, the judgment tends to be made such that the object exists. Therefore, it is possible to perform the judgment quickly while raising the accuracy of the judgment.

Figure 2A:
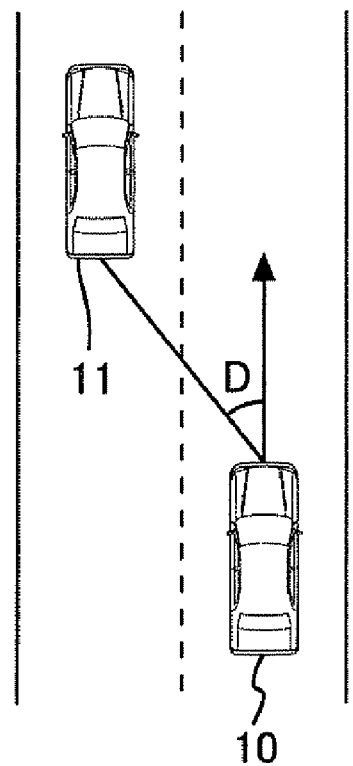
FIG. 2A shows a case in which the subject vehicle and the object vehicle travel in an identical direction.
Figure 2B:
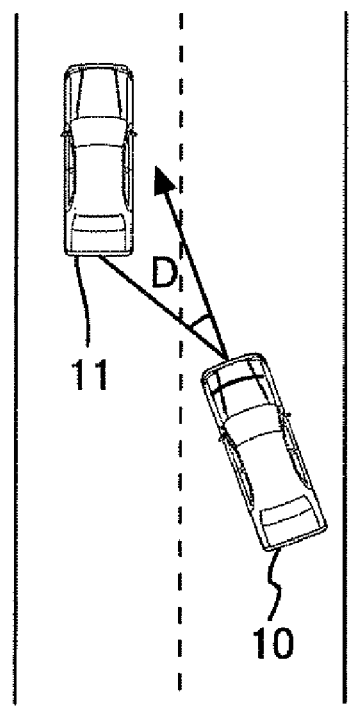
FIG. 2B shows a case in which the subject vehicle changes the course to a lane on which the object vehicle travels.

FIG. 2 shows the change of the relative angle D between the subject vehicle and the object vehicle (object). FIG. 2A shows a case in which the subject vehicle 10 and the object vehicle 11 travel in the same direction, and FIG. 2B shows a case in which the subject vehicle 10 changes the course to the lane on which the object vehicle 11 travels. The traveling direction of the subject vehicle 10 is indicated by arrows. The arrows are provided on the basis of the position of installation of the millimeter wave radar 2.

In FIG. 2A, the angle D of the object vehicle 11 with respect to the traveling direction of the subject vehicle 10 is relatively large. On the other hand, in FIG. 2B, the angle D of the object vehicle 11 with respect to the traveling direction of the subject vehicle 10 is relatively small. If the angle D of the object vehicle 11 with respect to the traveling direction of the subject vehicle 10 is changed as described above, the information of the object tends to be extrapolated, because the intensity of the reflected wave is changed. Whether the intensity of the reflected wave is lowered when the angle D is increased or the intensity of the reflected wave is lowered when the angle D is decreased differs depending on, for example, the shape of the object.

Figure 3:
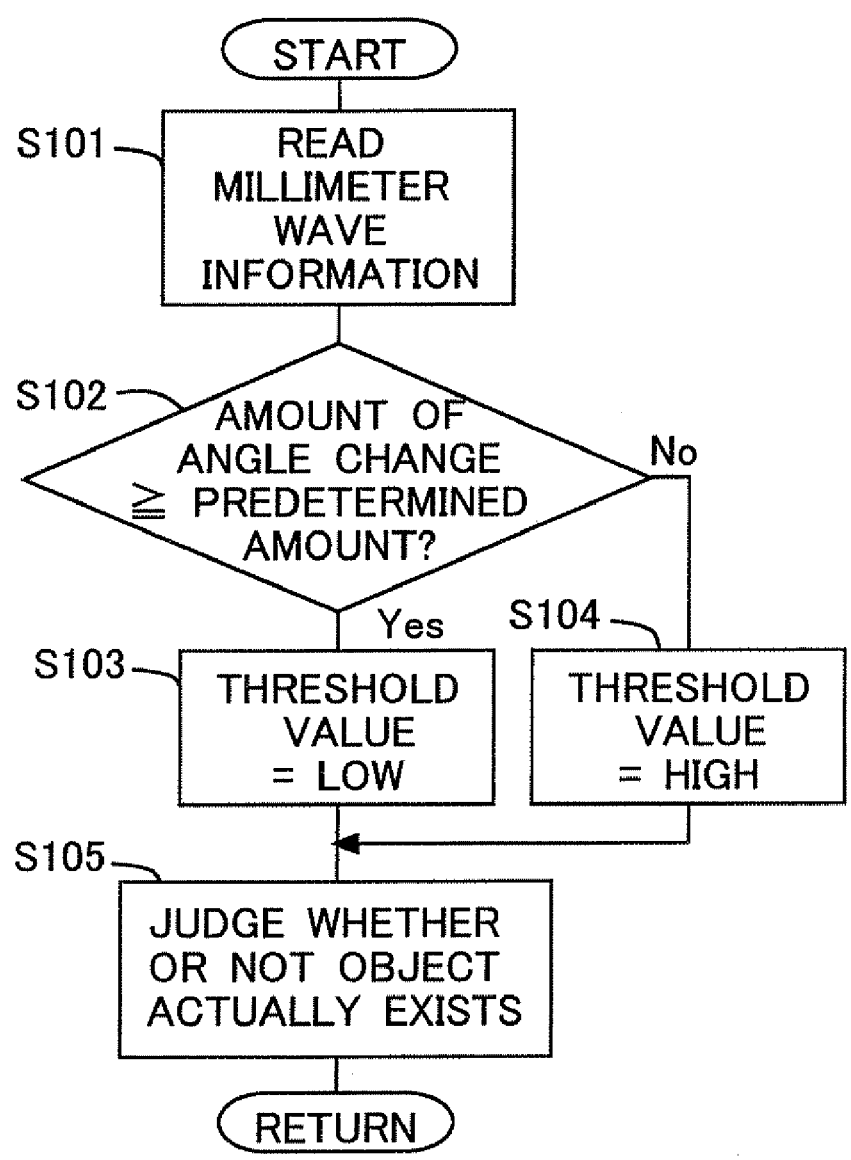
FIG. 3 shows a flow chart illustrating a flow to judge whether or not the object concerning the first embodiment actually exists.

Next, FIG. 3 shows a flow chart illustrating a flow to judge whether or not the object actually exists. This routine is repeatedly executed every time when a predetermined period of time elapses.

In Step S101, the millimeter wave information is read. That is, the output signal from the millimeter wave radar 2 is read by ECU 6.

In Step S102, it is judged whether or not the amount of change of the angle D of the object with respect to the traveling direction of the subject vehicle 10 is not less than a predetermined amount. The predetermined amount is the amount of change of the angle at which the intensity of the reflected wave may be changed to be not more than a threshold value, for which an optimum value is previously determined, for example, by means of an experiment. If the affirmative judgment is made in Step S102, the routine proceeds to Step S103. If the negative judgment is made, the routine proceeds to Step S109.

In Step S103, the threshold value of the existence probability is made to be relatively low. In this procedure, the threshold value may be lower than an ordinary threshold value. The degree of the decrease differs depending on the degree of the setting of the judgment accuracy. The degree of the decrease also differs depending on the position of installation of the millimeter wave radar 2 and the scanning range. Therefore, the optimum value may be determined, for example, by means of an experiment. In Step S104, the threshold value of the existence probability is made to be relatively high. In this procedure, the threshold value may be the ordinary threshold value. As for the ordinary threshold value, the optimum value can be also determined, for example, by means of an experiment.

In Step S105, it is judged whether or not the object actually exists. In Step S105, the existence probability is compared with the threshold value. If the existence probability is not less than the threshold value, it is judged that the object actually exists. The existence probability is calculated distinctly beforehand. The threshold value, which is set to be low in Step S103, is held for a predetermined period of time (for example, 10 cycles in relation to the calculation cycle) set to calculate the existence probability. After that, if the affirmative judgment is not made in Step S102, the threshold value, which is set in Step S104, is used.

If it is judged that the object actually exists and other conditions are further fulfilled, then the collision preventing apparatus 7 is operated.

In this embodiment, the threshold value of the existence probability is lowered when the amount of change of the angle D of the object with respect to the traveling direction of the subject vehicle is not less than the predetermined amount. However, the threshold value of the existence probability may be lowered, for example, when the subject vehicle changes the lane. That is, the threshold value of the existence probability may be lowered in such a state that the amount of change of the angle D may be not less than the predetermined amount. Similarly, the threshold value of the existence probability may be lowered on the basis of the amount of change of the relative position between the subject vehicle and the object.

As explained above, according to this embodiment, the condition to judge that the object actually exists is relaxed or relieved when the information, which is extrapolated if the amount of change of the angle D is not less than the predetermined amount, is included in the information of the object which is used to judge whether or not the object actually exists, as compared with when the extrapolated information is not included. Accordingly, it is possible to suppress such a judgment that the object does not actually exist although the object actually exists.

Second Embodiment

In this embodiment, the threshold value, with which it is judged that the object actually exists, is changed depending on whether the object is a moving object or a stationary object. The other apparatuses or devices and the like are the same as those of the first embodiment, any explanation of which will be omitted.

It is noted that the collision preventing action is unnecessary in some cases when the object is the stationary object. For example, when the millimeter wave radar 2 detects any roadside object such as a guard rail or the like, it is unnecessary to perform the collision preventing action in many cases. However, if the threshold value of the existence probability is lowered, it is feared that a case, in which it is unnecessary to perform the collision preventing action, may be also the objective of the execution of the collision preventing action. In view of the above, the threshold value of the existence probability is set depending on the state of the object, in addition to the angle D of the object with respect to the traveling direction of the subject vehicle. That is, the threshold value of the existence probability is relatively lowered if the object is the moving object, while the threshold value of the existence probability is relatively raised if the object is the stationary object. The threshold value, which is used when the object is the stationary object, is lower than the threshold value which is used ordinarily.

Accordingly, when the object is the moving object, for example, the collision preventing action is performed relatively easily even when the information of the object is extrapolated. On the other hand, when the object is the stationary object, for example, the collision preventing action is relatively hardly performed. Therefore, it is possible to suppress the execution of, for example, any unnecessary collision preventing action.

Figure 4:
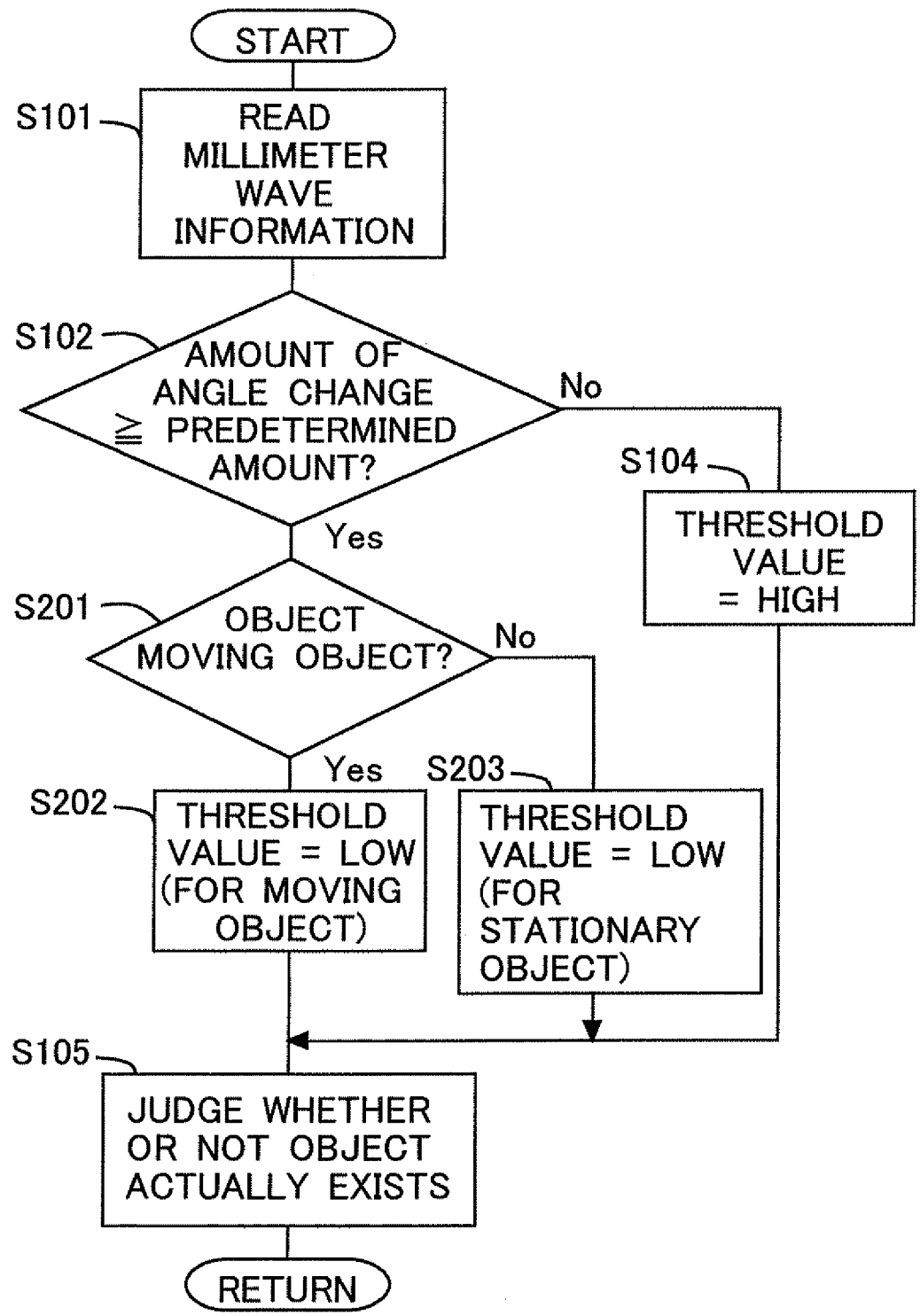
FIG. 4 shows a flow chart illustrating a flow to judge whether or not an object concerning a second embodiment actually exists.

FIG. 4 shows a flow chart illustrating a flow to judge whether or not the object actually exists. This routine is repeatedly executed every time when a predetermined period of time elapses. The steps, in which the same processes as those in the flow chart described above are performed, are designated by the same reference numerals, any explanation of which will be omitted.

If the affirmative judgment is made in Step S102, the routine proceeds to Step S201. If the negative judgment is made, the routine proceeds to Step S104.

In Step S201, it is judged whether or not the object is the moving object. For example, if the relative velocity between the subject vehicle and the object, which is acquired by the object information acquiring section 61, is approximately equal to the velocity of the subject vehicle which is acquired by the wheel velocity sensor 5, it is judged that the object is the stationary object. In any case other than the above, it is judged that the object is the moving object.

If the affirmative judgment is made in Step S201, the routine proceeds to Step S202. If the negative judgment is made, the routine proceeds to Step S203.

In Step S202, the threshold value of the existence probability is relatively lowered. In Step S202, a threshold value, which is lower than the threshold value set in Step S104, is set.

In Step S203, a threshold value of the existence probability, which is higher than the threshold value set in Step S202 and which is lower than the threshold value set in Step S104, is set. That is, the threshold value of the existence probability is lowered as compared with the ordinary case. However, the threshold value of the existence probability is raised as compared with the case in which the object is the moving object.

As described above, the threshold value of the existence probability is changed depending on whether the object is the moving object or the stationary object. Therefore, it is possible to enhance the detection accuracy of the object, and it is possible to suppress the execution of, for example, any unnecessary collision preventing action.

PARTS LIST

1: object detecting apparatus, 2: millimeter wave radar, 3: steering angle sensor, 4: yaw rate sensor, 5: wheel velocity sensor, 6: ECU, 7: collision preventing apparatus, 10: subject vehicle, 11: object vehicle, 61: object information acquiring section, 62: angle detecting section, 63: extrapolating section, 64: judging section.

The invention claimed is:

1. An object detecting apparatus comprising:
    an acquiring unit which acquires information of an object existing around a subject vehicle by means of a radar;
    an angle detecting unit which detects an angle of the object with respect to the subject vehicle;
    an extrapolating unit which extrapolates the information of the object when any information of the object is not acquired after acquiring the information of the object by the acquiring unit; and
    a judging unit which judges whether or not the object actually exists on the basis of the information of the object acquired by the acquiring unit and the information of the object extrapolated by the extrapolating unit, wherein:
    the judging unit relaxes a condition to judge that the object actually exists when the information, which is extrapolated by the extrapolating unit if an amount of change of the angle detected by the angle detecting unit is not less than a predetermined amount, is included in the information of the object to be used to judge whether or not the object actually exists, as compared with when the information, which is extrapolated by the extrapolating unit, is not included.

2. The object detecting apparatus according to claim 1, wherein:
    the judging unit calculates a probability of existence of the object on the basis of a number of times of acquisition of the information of the object by the acquiring unit and a number of times of extrapolation of the information of the object by the extrapolating unit in a predetermined period of time to judge that the object actually exists if the probability is not less than a threshold value; and
    the condition to judge that the object actually exists is relaxed by decreasing the threshold value.

3. The object detecting apparatus according to claim 2, wherein the threshold value is decreased when the object is a moving object as compared with when the object is a stationary object.

* * * * *